United States Patent Office 3,816,597
Patented June 11, 1974

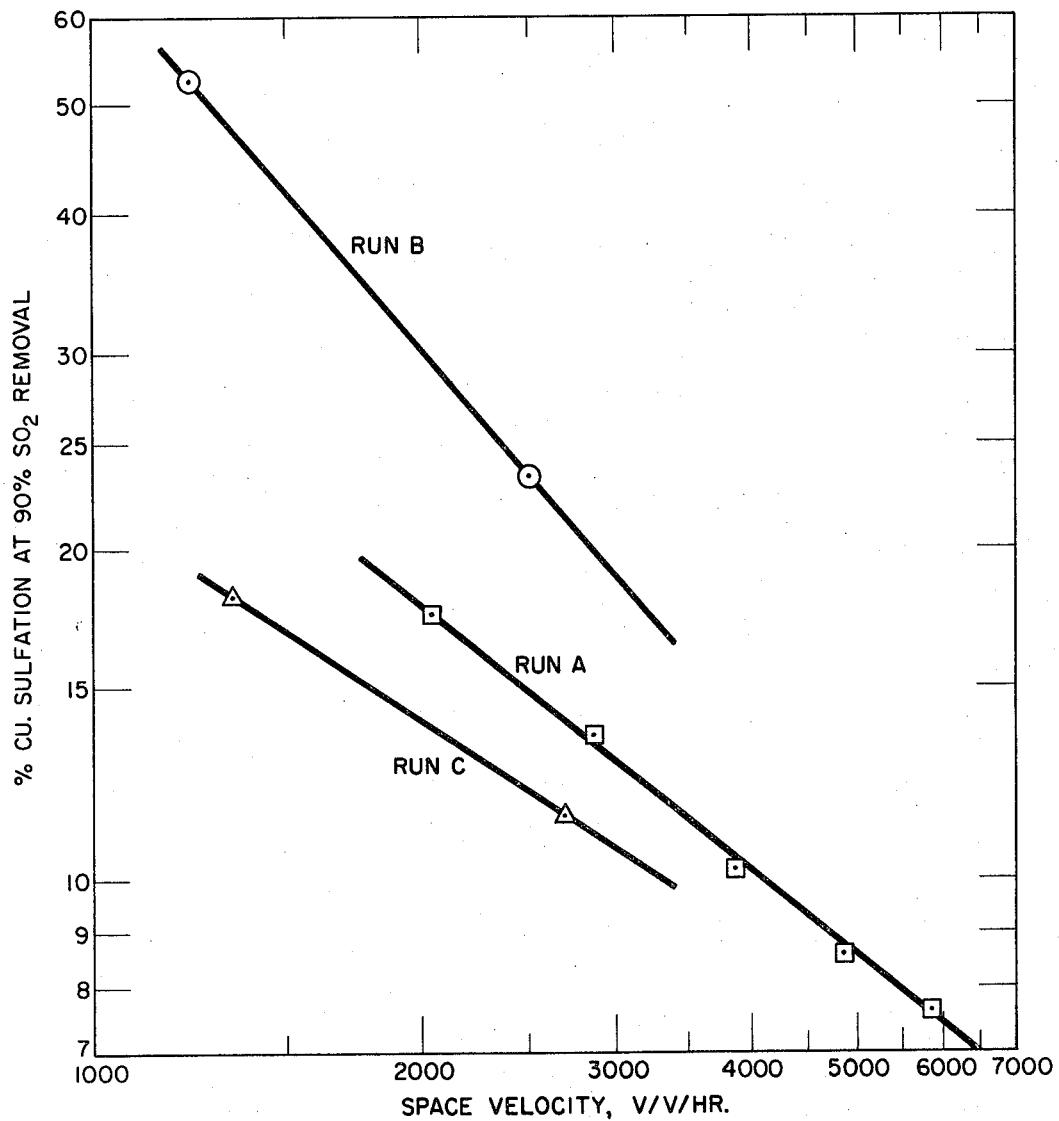

3,816,597
FLUE GAS DESULFURIZATION USING SURFACE IMPREGNATED SORBENT
Warren M. Smith, Baton Rouge, La., assignor to Esso Research and Engineering Company
Filed Nov. 1, 1971, Ser. No. 194,472
Int. Cl. B01j 9/00; C01b 17/60
U.S. Cl. 423—244
4 Claims

ABSTRACT OF THE DISCLOSURE

Sulfur dioxide is removed from flue gas by passing the flue gas through a fixed bed of a sorbent comprising an active material supported on a porous carrier, in which the active material is distributed predominantly in an outer layer of the carrier. The use of a surface coated rather than a fully impregnated sorbent improves the utilization of active material.

BACKGROUND OF THE INVENTION

This invention relates to processes for removal of sulfur dioxide from gases containing the same, and more particularly to a flue gas desulfurization process.

Sulfur dioxide is a constituent of various waste gases. Among these are flue gases formed by the combustion of fossil fuels, off gases from various chemical and petroleum refining processes, and smelter gases. A major source of sulfur dioxide pollution of the atmosphere is flue gas from electric power plants. Such flue gas typically contains about 0.2 to 0.3% by volume of sulfur dioxide, trace amounts of sulfur trioxide, and some oxygen (i.e., about 1 to 4% by volume) due to the use of excess air in combustion. Sulfur dioxide is irritating to the respiratory system, is toxic to plant life, and is corrosive to metals. Hence, it is imperative that discharge of sulfur dioxide into the atmosphere be held to a low level.

Various processes have been suggested for the removal of sulfur dioxide from gases. These may be classified generally into wet and dry processes. The present invention is concerned with the latter. Dry processes for the selective removal of $SO_2$ from gases generally employ a solid sorbent composition comprising an active material supported on a porous carrier. The active material is generally a metal or metal oxide, such as copper or copper oxide, and the porous carrier is generally an essentially inert material such as alumina, silica, silica-alumina, and the like. Dry processes for flue gas desulfurization using solid sorbents are disclosed, for example, in U.S. Pat. 3,501,897 and in British Pat. 1,089,716. Copper oxide on alumina, which is the sorbent disclosed in British Pat. 1,089,716, is a preferred flue gas desulfurization sorbent. Sorbents are prepared according to the teachings of these patents by impregnating the porous carrier material with a solution of a salt corresponding to the desired metal oxide and then calcining. This technique, which is the conventional technique for impregnating flue gas desulfurization sorbents, gives a sorbent in which the impregnating salt and therefore the corresponding metal oxide formed on calcination are distributed uniformly throughout the carrier. Desulfurization is accomplished by passing flue gas containing sulfur dioxide through a bed of the sorbent until the amount of $SO_2$ in the effluent reaches a predetermined level, then regenerating the sorbent with a reducing gas.

The active material of the sorbent ordinarily is not completely utilized. That is, when the sulfur dioxide content in the effluent flue gas reaches the predetermined level, there is still unconverted metal oxide in the sorbent. The present invention provides a flue gas desulfurization process in which improved utilization of the active material is achieved.

SUMMARY OF THE INVENTION

According to this invention, sulfur dioxide is removed from a waste gas containing the same by contacting the waste gas under desulfurization conditions with a solid sorbent comprising an active material supported on a porous carrier in which said active material is distributed predominantly in the outer portion of the carrier.

THE DRAWING

The sole figure is a graphical representation of the relationship between percentage sulfation at 90% $SO_2$ removal and space velocity for two sorbents according to the invention and for a comparison sorbent.

DESCRIPTION OF THE PREFERRED EMBODIMENT

The sorbent of this invention is in the form of particles of any desired shape, such as spherical pellets, cylindrical extrudates, saddles, Raschig rings, etc. Particles may be of any desired size. The sorbent particles used in this invention have an essentially unimpregnated inner zone, and an outer layer close to the external surface of the particle in which most of the active material is concentrated. This impregnated outer layer normally constitutes no more than 60% of the volume of the sorbent, and in a preferred embodiment constitutes about 10 to about 50% by volume of the sorbent. The inner zone, which has been described as "essentially unimpregnated," may not be completely devoid of active material, but the concentration of active material in the inner zone is much lower than in the outer layer, and most (usually 90% or more) of the active material is concentrated in the outer layer. When the active material is a highly colored material, such as copper oxide, the distribution of active materials in the sorbent can be readily seen by making a cross-sectional cut of a sorbent particle. Such a cut will reveal an inner core which is essentially white (the color of unimpregnated carrier) and a thin outer layer which has the characteristic blue-green color of copper oxide. The volume of the sorbent that is impregnated can be approximated by measuring the depth of impregnation and calculating the volume that is impregnated from the geometry of the sorbent particle.

Active materials which may be used in the sorbents of this invention include those which are known as active materials for flue gas desulfurization sorbents. Copper oxide is the preferred active material. A mixture of potassium oxide and vanadium pentoxide can also be used as the active material. Suitable sorbents are high surface area (typically over 100 square meters/gram) refractory materials which are known in the art, such as silica, alumina, and silica-alumina. Copper oxide supported on alumina is the preferred sorbent of the present invention. A combination of potassium oxide and vanadium pentoxide supported on silica can also be used.

The weight of active material in the surface impregnated sorbents of this invention is generally less than the weight of active material in conventional uniformly impregnated sorbents. Surface impregnated sorbents of this invention may contain as little as 0.5% by weight of active material up to a maximum of about 8% by weight of active material. Preferred active material contents are from about 1% to about 5% by weight. As stated before, most of the active material is concentrated in the outer portion of the sorbent. The concentration of active material within this outer layer is typically about 2% to about 15% by weight, and preferably about 4% to about 8% by weight. As stated above, this outer layer usually constitutes no more than 60% of the total sorbent volume, and preferably is less, e.g., from about 10% to about 50% of the total carrier volume. The sorbent is used efficiently when only the outer 40% of the sorbent is impregnated; even better efficiency results when only the outer 10% is impregnated. On the other hand, sorbent capacity decreases as the percentage impregnation decrease. As a consequence of this, an optimum practical sorbent will represent a compromise between capacity and efficiency of utilization of the active component of the sorbent. The active material percentages in this paragraph, when applied to copper oxide on alumina sorbents, refer to weight percent CuO, based on the total weight of CuO and carrier.

Various means can be used to impregnate sorbents according to this invention. The unimpregnated carrier can be prepared in particles of desired shape by known techniques. For example, the carrier material, such as alumina, can be mixed with water or dilute aqueous acid to form an extrusible plastic mix, which is then extruded into particles of desired shape. The shaped particles are normally calcined. Before impregnating the calcined particles with an aqueous solution, it is highly desirable to hydrate the alumina to a moisture content of about 10 to about 15%. If this is not done, particularly with uniformly impregnated sorbents made by immersing the calcined support in an aqueous impregnating solution, considerable breakage of the particles may occur because of the initially high heat of adsorption. Hydration may be carried out by exposure to ambient air, humidified if necessary. This hydration fills with water about 15 to about 25% of the pore volume of the sorbent, selectively filling the smallest pores of the structure. The sorbent can be surface coated by spraying an aqueous solution of impregnating salt, such as copper nitrate, while tumbling the shaped particles of carrier. Aside from eliminating the initially high heat of hydration, prehydration of the carrier also tends to exclude the impregnating salt solution from the smallest pores of the surface coated carrier, particularly if the sorbent is dried rapidly after spray coating to minimize any effects of diffusion. This is beneficial in flue gas desulfurization, particularly when copper oxide is the active material, because particles of copper in small pores are easily oxidized from copper to copper oxide, while such copper oxide is not readily converted to copper sulfate due to insufficient time available for diffusion of the surfur dioxide into the smallest pores. Spraying the impregnating solution onto the carrier particles results in a surface coating, i.e., a partial impregnation of the carrier only to a predetermined depth. This depth can be rather precisely predetermined by controlling the impregnation solution volume.

A second and preferred way of impregnating this sorbent only to a predetermined depth involves first completely impregnating the calcined carrier particles with a moderately polar, only slightly water-miscible substance, such as the $C_5$–$C_{10}$ saturated alcohols, and particularly the $C_5$–$C_8$ saturated alcohols. According to this preparation method, carrier particles can be formed and calcined as in the first method. It is not necessary in this preparation method to prehydrate the carrier before proceeding further. In fact, it may be desirable not to do so, since filling the smallest pores of the structure with a polar material of limited water-miscibility will tend to keep the copper solution out of the small pores even in the outer layers to be impregnated with the copper. The calcined sorbent material is immersed in the liquid such as 1-pentanol for a sufficient time to saturate the sorbent completely. Ten minutes was found sufficient for this purpose. Immersion time in the liquid is not material as long as the time is sufficient for complete saturation. The sorbent is then removed from the organic liquid, as for example by decantation. The liquid-saturated sorbent is then impregnated with an aqueous impregnating salt such as copper nitrate, by immersing the sorbent in the impregnating salt solution. The length of time of impregnation in this step is important, since the longer the impregnation time, the greater the volume of sorbent that is impregnated. This in turn increases the loading of active material in the sorbent.

The liquid displacement technique is preferable to the spray coating technique in that an impregnation of more uniform depth can be obtained. Also, no tumbling is required in the liquid displacement technique, which will minimize any attrition losses during impregnation.

Flue gas desulfurization and sorbent regeneration using the sorbent herein described can be carried out under conventional conditions. Thus, desulfurization of a waste gas containing $SO_2$, such as flue gas, is carried out by contacting the waste gas with a fixed bed of the sorbent under suitable desulfurization conditions, e.g., temperatures of about 600° to about 900° F., and space velocities of about 1000 to about 5000 v./v./hr. (although higher space velocities can be used with some loss of sulfation), until the total amount of $SO_2$ in the effluent gas reaches a predetermined value, e.g., 10% of the total amount of $SO_2$ in the incoming flue gas. Best results are obtained when the space velocity does not exceed 3000 v./v./hr. The utilization of active material is usually improved with higher temperatures. Thus, a greater percentage of copper oxide is sulfated (i.e., converted to copper sulfate) at 750° F. than at 650° F. In the case of a flue gas initially containing 0.2 to 0.3% by volume of $SO_2$, a suitable maximum effluent concentration may be about 500–700 p.p.m. by volume, representing about 90% removal of $SO_2$ over the entire sorption period. When the effluent quantity of $SO_2$ rises to this value, the sorption period is terminated and the regeneration period is begun.

When using the preferred copper oxide on alumina sorbent, the copper content may be in the form of metallic copper rather than copper oxide at the start of a sorption cycle. (Whether the copper content is in the form of Cu, CuO, or a mixture, depends on the choice of regeneration gas.) Any metallic copper present is oxidized quantitatively to copper oxide by oxygen in the flue gas during the sorption cycle. Copper oxide reacts with $SO_2$ and additional oxygen to form copper sulfate, but this reaction takes place much more slowly than the oxidation of Cu to CuO. Hence, a large part of the CuO in the sorbent usually remains unreacted at the end of a sorption cycle. The amount of CuO converted to $CuSO_4$ during a sorption cycle (which was ended in all examples herein when the amount of effluent $SO_2$ reached 10% of the amount of $SO_2$ entering over the course of the whole sorption cycle) represents the percentage sulfation.

Regeneration is preferably carried out at approximately the same sorbent bed temperatures as desulfurization using, as the regeneration gas, a reducing gas such as hydrogen, carbon monoxide, a mixture of these two gases, or a hydrocarbon or mixture of hydrocarbons which is gaseous under regeneration conditions, such as ethane, propane, butane, etc., or mixtures of these. Methane is probably better avoided since it is less reactive than its homologues. Best results are obtained when the reducing gas is mixed with steam. Hydrogen, a very active agent, causes all of the copper content of a copper oxide sorbent to be converted to a mixture of metallic copper and copper sulfide, the latter an undesirable side reaction product. Less active reducing agents, e.g., butane, cause reduction of copper sulfate primarily to CuO. In the case of hydrogen and/or CO, steam is valuable in suppressing sulfide formation, and should constitute from about 50% to about 95% by volume of the total regeneration gas mixture. Steam is also valuable in admixture with hydrocarbons; suppression of coke formation is a major advantage of the steam in this instance. A complete operating cycle in the process herein includes a sorption cycle followed by a regeneration cycle.

The surface impregnated sorbents used in the present invention give better percentage of sulfations than do fully impregnated sorbents, even when used under otherwise identical conditions. At a given weight percentage of active material in a sorbent, sulfation percentages, i.e., the percentage of active material which is converted to the sulfate (copper sulfate when the active material is copper oxide) is higher when this active material is concentrated near the sorbent surface than when it is distributed uniformly throughout the sorbent. An explanation of this phenomenon is that the reaction of copper oxide with sulfur dioxide and oxygen is largely diffusion limited when the copper is supported on refractory material of conventional pore structure. It is understood, of course, that the inventor does not wish to be bound by any theory or explanation. Surface impregnated sorbents of this invention have the further advantage that overall active material loadings are usually lower in surface impregnated sorbents, than in fully impregnated sorbents. (Note, for example, that the active material loading in sorbents of this invention does not exceed 8% by weight, while copper oxide loadings as high as 15% or even higher have been reported in prior art fully impregnated sorbents, such as the sorbent described in British Pat. 1,089,716.) Surface impregnation and lower loading of active material together substantially improve active material utilization.

This invention will now be described further with reference to specific embodiments as shown by the following examples.

EXAMPLE 1

Three sorbents, designated A, B and C were prepared. Sorbents A and B were surface coated sorbents in which the outer 40% and outer 10% by volume, respectively, were impregnated with copper oxide. Sorbent C, a comparison sorbent, was a fully impregnated sorbent having copper oxide substantially uniformly distributed throughout. Closely similar impregnating solutions were used for all three sorbents, so that the concentrations of copper oxide in each sorbent were similar in the copper containing portion. Overall, sorbent A contained 3.76% by weight of copper (4.7 weight percent CuO), sorbent B contained 0.95% by weight of copper (1.2 weight percent CuO), and sorbent C contained 8.6% by weight of copper (10.8 weight percent CuO). The sorbents were prepared from a commercially available, spray dried alumina powder made by the Harshaw Chemical Company, Cleveland, Ohio, and supplied under their designation AL–1700P. As supplied, the alumina powder contained 25.5% by weight of volatile matter. After calcining, the alumina powder had a surface area (BET Method) of 280 m.$^2$/g. and a pore volume of 1.0 cc./g.

Sorbent A.—300 parts by weight of the above-described alumina powder was mixed with 311 parts by weight of 17% (by weight) aqueous acetic acid, and the resulting mix was extruded and shaped into ½ inch saddles approximating the shape shown in U.S. Pat. 2,639,909. The saddles were air dried, oven dried at 250° F., and calcined in air for 3 hours at 1400° F. Several batches of saddles were made in this manner and composed to give 836 g. of calcined saddles. To impregnate these saddles, an aqueous impregnating solution containing 175 g. of Cu(NO$_3$)$_2$·3H$_2$O in 225 cc. of solution was made up. The saddles were divided into two portions for impregnation. Each portion was placed in a two-gallon fiber board cylindrical container maintained almost horizontally on rollers and having a hole in the lid for an air atomizing spray nozzle. The saddles were tumbled slowly by hand while spraying 104 cc. of the copper nitrate solution through the spray nozzle using 10 p.s.i.g. air atomization. The time required for the spraying step was 35 minutes for the first portion and about 60 minutes for the second portion. The two portions were dried separately overnight at 250° F., combined and calcined in air for 3 hours at 800° F. Analysis of the calcined materials showed 3.76% by weight Cu (4.7% by weight CuO), a surface area of 202 m.$^2$/g., and a pore volume of 0.54 cc./g. The effect of spraying the solution was to limit the depth of impregnation. Approximately the outer 40% of the total volume of the saddles was impregnated, as indicated by visual observation of the cross-sections of several saddles. These saddles were observed to have a fairly sharp line of demarcation at an approximately (although not completely) uniform depth beneath the external surface of the saddle. The outer zone was green, indicating the presence of copper oxide, and the inner zone was white, the color of the alumina carrier, indicating substantially no impregnation in the inner zone. The particle density of these saddles was 1.22 g./cc. or 76 lb./ft.$^3$. A packed bed of 817 g. (1.8 lbs.) of these saddles had a volume of 2.13 liters (0.0755 ft.$^3$), giving a bed density of 23.9 lbs./ft.$^3$. This represents a free space volume of about 96%.

Sorbent B.—The above-described alumina powder was peptized with dilute acetic acid and the resulting mix was extruded into saddles ½ inch long having the shape shown and described in U.S. Pat. 2,639,909 using the process and machine described in U.S. Pat. 3,060,508. As with sorbent A, the formed saddles were first dried and then calcined in air for 3 hours at 1400° F. An aqueous copper nitrate impregnating solution containing 40.4 g. of

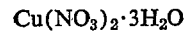

$$Cu(NO_3)_2 \cdot 3H_2O$$

in 50 cc. of solution was prepared. 400 g. of the calcined saddles were coated with 23 cc. of this solution over a period of 33 minutes. As with sorbent A, the solution was converted to a spray using air at 4 p.s.i.g. in an air atomizer and applied to the calcined saddles while tumbling them slowly by hand in the two-gallon cylindrical fiber board container. A second preparation was made similarly, using 361 g. of saddles and 20.5 cc. solution, atomizing the solution with 4–10 p.s.i.g. air and applying the spray over a period of 78 minutes. The impregnated saddles were dried at 250° F. and then calcined in air at 800° F. for 3 hours. Analysis of the calcined material showed 0.95% by weight Cu (1.2% by weight CuO), a surface area of 202 m.$^2$/g., and a pole volume of 0.59 cc./g. Approximately the outer 10% by volume of the saddles was impregnated, as indicated by visual observation.

Sorbent C.—Sorbent C was made from the same saddle shaped support used for sorbent B. After drying, and calcining in air for 3 hours at 1400° F., the calcined saddles were exposed to ambient air for 19 hours. The calcined saddles (876 g.) increased in weight to 980 g., which represented an increase in weight of 104 g. or 11.9 weight percent. For a pore volume of about 0.50 cc./g., this represented a filling of about 24% of the pore volume with water. An aqueous impregnating solution containing 350 g. of Cu(NO$_3$)$_2$·3H$_2$O in 500 cc. of solution was prepared. The air exposed saddles were completely wet with the copper nitrate solution for 5 minutes, then drained on paper towels, air dried 48 hours, oven dried at 250° F. over a weekend, and calcined for 3 hours at 800° F. Analysis of the calcined materials showed 8.6% by weight Cu (0.8% by weight CuO), a surface area of 187 m.$_2$/g., and a pore volume of 0.51 cc./g. These saddles were uniformly impregnated with copper oxide throughout the saddle.

Testing.—The effectiveness of sulfur dioxide removal from flue gas in a fixed sorbent bed was determined in a uniform test procedure.

The reactor used in all runs was en externally heated vertical tubular reactor having a 3 inch inside diameter tube 26 inches long. Funnel shaped end sections provided connections between this reaction tube and 1½ inch diameter headers. In each run, the reactor contained a packed bed of impregnated copper on alumina saddles 18 inches deep, with unimpregnated alumina saddles above and below this packed bed. Each of the sorbents A, B and C was tested in a separate run which bears the same letter as the sorbent under test.

The sorbents in all runs were alternately sulfated and regenerated by passing a synthetic flue gas and a regeneration gas, respectively, through the reactor. The synthetic flue gas contained about 0.1–0.2% by volume of SO$_2$ (as indicated in Table II below), about 2.5–4% by volume of oxygen, with the balance mostly nitrogen. The flue gas was passed downwardly through the reactor at an inlet temperature of about 650° F. and at various space velocities. Flow of flue gas was discontinued when the amount of SO₂ in the reactor effluent reached 10% of the amount of SO₂ in the entering flue gas. Regeneration was carried out by passing a mixture of about 60% by volume of steam and 40% by volume of hydrogen downwardly through the reactor.

Table I below summarizes the properties of Sorbents A, B, and C.

TABLE I

| Sorbent | A | B | C |
| --- | --- | --- | --- |
| Wt. percent: | | | |
| Cu | 3.76 | 0.95 | 8.6 |
| CuO | 4.7 | 1.2 | 10.8 |
| Volume percent impregnated | 40 | 10 | 100 |
| Surface area, m.²/g | 202 | 202 | 187 |
| Pore volume, cc./g | 0.54 | 0.59 | 0.51 |

Table II below summarizes the percentage sulfation at 90% SO₂ removal (i.e., the percentage of the copper oxide present in the sorbent that was sulfated when removing an integrated average of 90% of the SO₂ from the inlet gas) and the maximum (i.e., exotherm) temperature at various space velocities in Runs A, B and C. Sulfation and isotherm temperature data in most cases represent an average of a plurality of cycles. The number of cycles averaged is shown in parentheses.

TABLE II

| | Run A | | Run B | | Run C | |
| --- | --- | --- | --- | --- | --- | --- |
| Sorbent | A | | B | | C | |
| Inlet flue gas temp., °F | 650 | | 650 | | 650 | |
| Inlet SO₂ concentration, p.p.m. | 1,000–2,000 | | 1,000–1,100 | | 2,000 | |
| | Percent sulfation | Max. temp., °F. | Percent sulfation | Max. temp., °F. | Percent sulfation | Max. temp., °F. |
| Space velocity, v./v./hr.: | | | | | | |
| 1,240 | | | 52.6 (1) | 725 | | |
| 1,340 | | | | | 18.0 (4) | 945 |
| 2,050 | 17.5 (1) | 855 | | | | |
| 2,500 | | | 23.1 (1) | 725 | | |
| 2,700 | | | | | 11.5 (6) | 900 |
| 2,880 | 13.6 (3) | 840 | | | | |
| 3,860 | 10.3 (3) | 805 | | | | |
| 4,860 | 8.6 (2) | 800 | | | | |
| 5,880 | 7.7 (4) | 780 | | | | |

Sulfations in Run B and to a less extent in Run A were far better than in Run C. Reference to Table II and FIG. 1 shows that this is so in spite of the fact that the maximum reactor temperatures reached during the flue gas sorption period were lower in Run A, and particularly in Run B, than in Run C.

It appears that the copper oxide close to the external surface of the sorbent particles sulfates much more readily that the copper oxide closer to the center of the particle due to a limited diffusion rate for the sulfur dioxide. As a consequence, the efficiency of sulfation is greater when the copper oxide is located only near the particle surface and not distributed uniformly throughout the partcle. Reference to the following Table III illustrates this more clearly. Table III contains data for Runs B and C abstracted from Table II for operation with an inlet flue gas temperature of 650° F. and additional data for operation with a higher flue gas temperature of 700° F.

| | Run B | | Run C | |
| --- | --- | --- | --- | --- |
| Volume percent impregnated | 10 | | 100 | |
| | Space velocity, v./v./hr. | Percent Copper sulfated | Space velocity, v./v./hr. | Percent copper sulfated |
| Inlet flue gas temperature: | | | | |
| 650° F | 2,500 | 23.1 | 2,700 | 11.5 |
| 700° F | 3,480 | 23.6 | 2,700 | 11.0 |

These data indicate no better utilization of the completely impregnated sorbent in Run C for a 50° F. increase in temperature (indication of a highly diffusion controlled reaction) whereas with the surface impregnated sorbent in Run B increasing the temperature by 50° F. allowed a 40% increase in inlet flue gas space velocity for the same sorbent untilization.

EXAMPLE 2

This example compares sulfation of copper oxide in a bed of surface impregnated sorbent versus sulfation of copper oxide in a bed of uniformly impregnated sorbent having approximately the same copper concentration. The surface impregnated sorbent was evaluated in Run D, and the uniformly impregnated sorbent in Run E, the data for both of which are given in the following Table VI.

Runs D and E both used fixed beds of copper oxide supported on alumina, with a copper content gradient decreasing stepwise from the inlet end to the exit end of the bed. The reactor and the flue gas desulfurization-sorbent regeneration cycle were the same as in Example 1.

The sorbent bed in Run D contained three sorbents, 1, 2 and 3, of approximately equal volumes, and of progressively decreasing copper contents, located in the bed in the order named from top to bottom. Run E used four sorbents, 4, 5, 6 and 7, of progressively decreasing copper contents located in the sorbent bed in the order named from top to bottom.

The sorbents were prepared as follows:

All the sorbents used in this example were prepared from a commercially available alumina powder, "Catapal S" alumina, sold by the Continental Oil Company, New York, N.Y. The alumina was extruded into saddles similar in shape and size to those used for sorbents B and C, previously described. The saddles were dried, calcined at 1400° F. for 3 hours, and hydrated in air at room temperature for two days to a water content of 7.0% based on total weight. The hydrated alumina saddles were divided into seven portions, having the following weights.

Portion: Weight, grams
1 ---------------------------------------- 382.4
2 ---------------------------------------- 388.0
3 ---------------------------------------- 383.0
4 ---------------------------------------- 309.3
5 ---------------------------------------- 314.0
6 ---------------------------------------- 300.7
7 ---------------------------------------- 312.4

Portions 1 through 3 were each immersed in 1-pentanol to completely fill the pores. An aqueous impregnating solution was prepared by dissolving 1370 g. of $$Cu(NO_3)_2 \cdot 3H_2O$$

in sufficient water to give 1500 cc. of solution. This solution was divided into two portions. The first portion of alumina saddles was immersed for 12.5 minutes in the first portion of copper nitrate solution. The second and third portions of alumina saddles were immersed in the second portion of copper nitrate solution for 6 minutes and 1 minute, respectively. After removing the saddles from the copper nitrate solution, the excess of impregnating solution was removed from each portion of impregnated alumina saddles by blotting on paper. The impregnated saddles were dried overnight at 200° F., then calcined 1 hour at 300° F., 1 hour at 500° F., and 3 hours at 800° F. Copper contents and impregnation depths of portions 1 to 3 are indicated in Table IV below.

| Portion | 1 | 2 | 3 |
|---|---|---|---|
| Cu content, percent by weight | 4.3 | 3.7 | 2.2 |
| CuO content, percent by weight | 5.4 | 4.6 | 2.8 |
| Nominal, percent impregnated | 60 | 45 | 30 |
| Actual, percent impregnated | 60 | 62 | 48 |

The actual volume percentage impregnated was determined for each portion by selecting five saddles at random, breaking them in half, measuring the total and unimpregnated areas of the cross-section with a planimeter, calculating the percentage of the cross-sectional area that was impregnated, and then averaging the results. The relatively large differences between the nominal and actual percent impregnated in portions 2 and 3 represent incomplete control of the impregnation process at this early data of development.

Portions 4, 5, 6 and 7 of the hydrated alumina saddles were fully impregnated with copper nitrate solution as follows. Four aqueous copper nitrate impregnating solutions were prepared as shown in Table V below by dissolving the indicated weights of copper nitrate in sufficient water to prepare the indicated volumes of solution. The volumes of solution actually used for impregnation are also indicated in Table V. The volumes of solution used were 15% greater than the volumes calculated as necessary to saturate the amount of saddles used. Each portion of the hydrated alumina saddles was placed in a quart jar, the indicated volume of solution added, and the saddles completely soaked with the solution by keeping the jar in motion for several minutes. Following this, excess solution remaining was drained off, the saddles blotted on paper towels, dried and then calcined as for portion 1–3.

TABLE V

| Sorbent | 4 | 5 | 6 | 7 |
|---|---|---|---|---|
| Weight of hydrated alumina | 309.3 | 314.0 | 300.7 | 312.4 |
| Weight of alumina, dry basis | 287.6 | 292.0 | 279.6 | 292.6 |
| Impregnating solution: | | | | |
| $Cu(NO_3)_2 \cdot 3H_2O$, g | 81.7 | 48.38 | 31.84 | 84 |
| Volume solution, cc | 250 | 200 | 200 | 200 |
| Concentration, g./cc | 0.327 | 0.242 | 0.159 | 0.42 |
| Volume used, cc | 161.8 | 164.3 | 157.3 | 172 |
| Nominal Cu, weight percent | 4 | 3 | 2 | 5.5 |
| Actual Cu, weight percent (3 analyses) | 4.3 | 3.3 | 1.4 | —— |
|  | 4.4 | 3.0 | 1.8 | 5.5 |
|  | 4.0 | 2.8 | 0.7 | 5.4 |
| Average Cu, weight percent | 4.2 | 3.0 | 1.3 | 5.5 |
| Average CuO, weight percent | 5.3 | 3.8 | 1.6 | 6.9 |

The reasons for the wide variation in analytical results for sorbent 6 are not known at present.

Runs D and E were then carried out to determine the effectiveness of partially impregnated sorbents 1–3 versus the fully impregnated sorbents 4–7 for the removal of sulfur dioxide from flue gas. The reactor was the same as in Example 1. In Run D, the reactor contained a packed bed of impregnated copper on alumina saddles 18 inches deep with unimpregnated alumina saddles above and below this packed bed. The packed bed in Run D consisted of approximately equal volumes of sorbents 1, 2 and 3 arranged in order from top to bottom. The packed bed in Run E was also 18 inches deep, and consisted, in order from top to bottom, of approximately equal volumes of sorbents 4, 5, 6 and 7. Synthetic flue gas having an inlet temperature of 650° F. was passed through the bed at a space velocity of 2500 v./v./hr. in both runs. Flow of flue gas was discontinued when the $SO_2$ concentration in these runs reached 500 p.p.m. Regeneration was carried out with a mixture of about 60% by volume of steam and 40% by volume of hydrogen and having an inlet temperature of about 650° F. Both flue gas and regeneration gas were passed downwardly through the reactor. Results are shown in Table VI below.

TABLE VI

|  | Run D, partially impregnated | | Run E, fully impregnated | |
|---|---|---|---|---|
|  | Nominal vol. percent impreg. | Weight percent Cu | Vol. percent impreg. | Weight percent Cu |
| Sorbent: | | | | |
| Top bed section | 60 | 4.3 | 100 | 5.5 |
| Middle bed section | 45 | 3.7 | 100 | 4.2 |
|  | | | 100 | 3.0 |
| Bottom bed section | 30 | 2.2 | 100 | 1.3 |
| Average | 45 | 3.4 | 100 | 3.5 |
| Process results: | | | | |
| Flue gas rate, v./v./hr | 2,500 | | 2,500 | |
| Inlet gas temp., °F | 650 | | 650 | |
| Inlet $SO_2$, p.p.m | 2,000 | | 2,000 | |

|  | Cycle Nos. | Percent of CuO sulfated* | Cycle Nos. | Percent of CuO sulfated* |
|---|---|---|---|---|
| Sulfation data | 426–480 | 17.8 | 223–233 | 15.6 |
|  | 1,290–1,299 | 22.3 | 576–578 | 15.4 |
|  | 1,436–1,492 | 20.6 | 1,566–1,582 | 15.4 |
| Average | | 20.2 | | 15.5 |

*When removing an integrated average of 90% of the $SO_2$ from the inlet gas.

Results in test Run D show an improvement over the results obtained in comparison Run E. The overall average copper content of the sorbent beds in both examples was closely comparable at 3.4 versus 3.5 weight percent Cu (4.3% vs. 4.4% CuO by weight). This example indicates that better copper sulfations are obtained at comparable copper loadings under otherwise identical or closely similar conditions when the active material is concentrated near the external surface of the sorbent instead of being uniformly distributed throughout the sorbent.

What is claimed is:

1. In a process for removing sulfur dioxide from a gas containing sulfur dioxide and oxygen in which said gas is contacted at a temperature in the range of about 600° F. to about 900° F. with a solid sorbent in the form of particles comprising a porous carrier having supported thereon material active for removing sulfur dioxide from gases and in which said sorbent is regenerated with a reducing gas, the improvement in which said particles have an outer portion constituting no more than about 60% by volume of said carrier and containing at least about 90% of the total quantity of the active material, and an inner zone having a substantially lower concentration of active material than said outer portion.

2. A process according to claim 1 in which said carrier is alumina.

3. A process according to claim 2 in which said active material comprises copper oxide.

4. A process according to claim 1 in which said outer portion constitutes from about 10% to about 50% by volume of said carrier.

References Cited

UNITED STATES PATENTS

| 2,746,936 | 5/1956 | Plank | 252—465 |
| 3,501,897 | 3/1970 | Van Helden et al. | 432—244 X |
| 3,615,196 | 10/1971 | Welty et al. | 423—244 |

OSCAR R. VERTIZ, Primary Examiner

J. COOPER, Assistant Examiner

U.S. Cl. X.R.

252—463, 476, 477